Aug. 7, 1956     F. A. MAITLAND     2,757,882
TENSIONING DEVICE
Filed Sept. 1, 1955
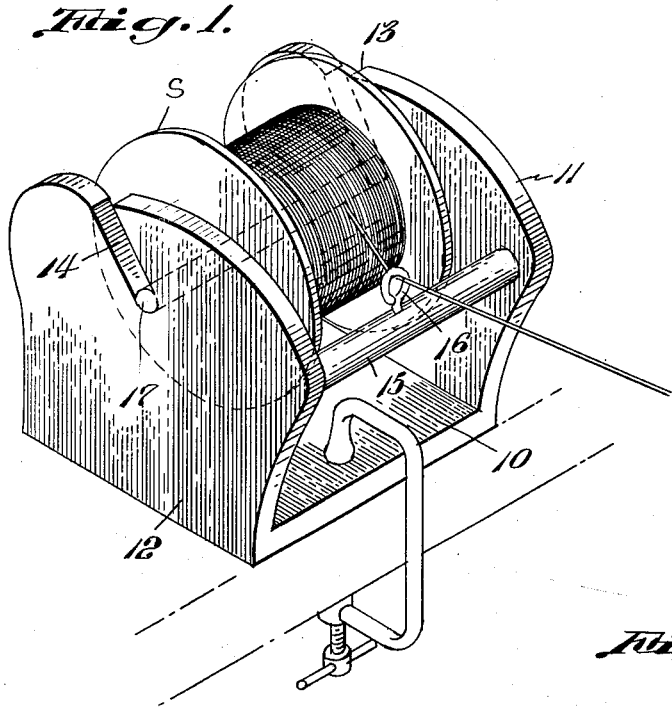
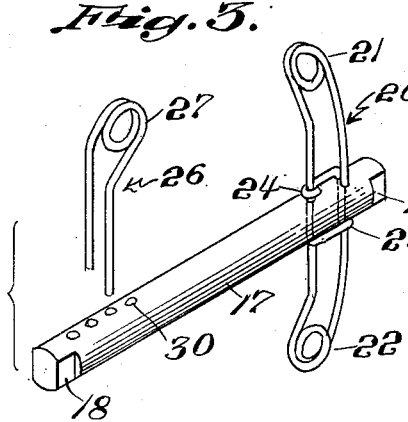
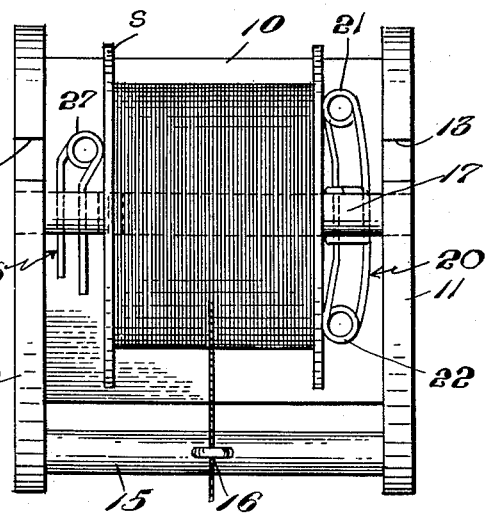
INVENTOR.
Francis A. Maitland
BY Barlow & Barlow
ATTORNEYS.

United States Patent Office 2,757,882
Patented Aug. 7, 1956

2,757,882
TENSIONING DEVICE
Francis A. Maitland, Pawtucket, R. I.

Application September 1, 1955, Serial No. 532,092

2 Claims. (Cl. 242—156)

This invention relates to a tensioning device and more particularly to a tensioning device for applying tension to a cord or thread which is supplied on a spool.

The article of this invention has general utility and may be used in a variety of applications, such as cord dispensing, or wherever a spool of twine or the like need be transferred from its storage spindle or spool to another utilization device. For instance, one such application may be for transferring a spool of fishing line to the fishing reel.

One of the objects of this invention is to provide an article whereby a spool may be readily held on an arbor and dispensed therefrom.

Another object of the invention is to provide a support stand including a removable arbor on to which the spool may be readily inserted and may not be easily dislodged.

A still further object of the invention is the provision of a simple and inexpensive brake for keeping the thread, twine, or other spooled material reasonably taut and for preventing the spool from rotating freely.

With these and other objects in view, the invention consists of certain novel features of construction as will be more fully described and particularly pointed out in the appended claims.

In the accompanying drawings:

Figure 1 is a perspective view of my dispensing device clamped to a table or other support;

Figure 2 is a top view of my dispensing device, showing the tensioning arrangement; and Figure 3 is a perspective view of the arbor, showing one of the tensioning devices in detached relationship thereto.

Referring to the drawings, the dispenser consists of a base 10 to which there is attached at two opposite ends thereof upright end walls or brackets 11 and 12. Each of the brackets 11 and 12 is provided with a slot 13 and 14, respectively, that is cut at an angle to the vertical in each of the brackets. To effect a more rigid structure, a bar 15 extends between the two end walls 11 and 12 and carries thereon an eye 16 which is adapted to serve as a guide for the thread or twine being dispensed from the device. An arbor 17 is adapted to fit in the slots 13 and 14, this arbor being provided with flats 18 and 19 at either end thereof which will engage the edge of the slots 13 and 14 and thereby prevent the arbor from turning. At one end of the arbor there is mounted a spring member 20.

This spring member 20 is preferably formed from spring brass wire and is provided with a double turn helix 21, 22 at either end thereof so that the wire doubles back upon itself and assumes a generally concave shape. The spring member 20 is suitably attached to this arbor 17 as by passing the wire members through the diameter thereof and turning the ends, such as 24 and 25, at right angles to the general axis of the spring. A second spring member 26 is provided for the other end of the arbor and consists also of spring brass wire that is doubled back on itself and has an oblique portion 27 that is characterized by a double turn helix. The two ends of the wire of this spring 26 are in spaced relationship and are adapted to be inserted into two of a plurality of holes 30 that are provided along the arbor 17 adjacent one end thereof. This arrangement will allow various size spools S which may be placed on the arbor 17 to be received and assures that the two spring members 20 and 26 will be in engagement with the end walls of the spool.

As will be seen more clearly in Figure 2, the helical portions of the spring 20 and 26 engage the end walls of the spool S at a location spaced radially outwardly from the axis of the spool and exert a pressure thereon at this location. This is due to the fact that the springs 20 and 26 form a complete or partial concave section and tend to return to this concave form when being released from a straight line position as a result of pressure from the end walls of the spool mounted on arbor 17.

To use the device, it will be apparent that the arbor 17 is removed from its support and the removable spring member 26 is withdrawn from the opposite end. A spool S may then be inserted on to the arbor 17 and the spring member 26 inserted in appropriate holes 30 so as to exert tension on the side walls of the spool. The pressure exerted by the springs 20 and 26 tends to hold the spool stationary, and thus thread or yarn may be withdrawn therefrom only when a pull is exerted.

I claim:

1. A tensioning device including an arbor upon which a spool is adapted to be mounted, a first spring device mounted at one end of said arbor, said spring device comprising a wire member bent to a generally concave shape and extending diametrically through said arbor on either side thereof, a second spring member spaced from said first member adjacent the other end of said arbor, said second spring member having at least a portion thereof extending towards said first spring member and being mounted on a diameter of said arbor.

2. In a cord dispenser having two spaced brackets and an arbor removably mounted therebetween, a tensioning device for said dispenser comprising a concave wire spring member mounted at one end of said arbor and diametrically thereacross to extend on either side thereof, the ends of said spring device extending toward the other end of said arbor, a second spring device mounted at the other end of said arbor and having at least a portion thereof extending toward said first spring device, said spring devices adapted to engage the walls of the spool mounted on said arbor.

References Cited in the file of this patent

UNITED STATES PATENTS 637,276    McLean _____ Nov. 21, 1899

FOREIGN PATENTS 153,981    Great Britain _____ Nov. 25, 1920
333,568    Germany _____ Mar. 1, 1921